July 3, 1934.   J. G. CLARK ET AL   1,965,278
GAS, AIR, OR LIQUID HEATING APPARATUS
Filed July 29, 1931   3 Sheets-Sheet 1
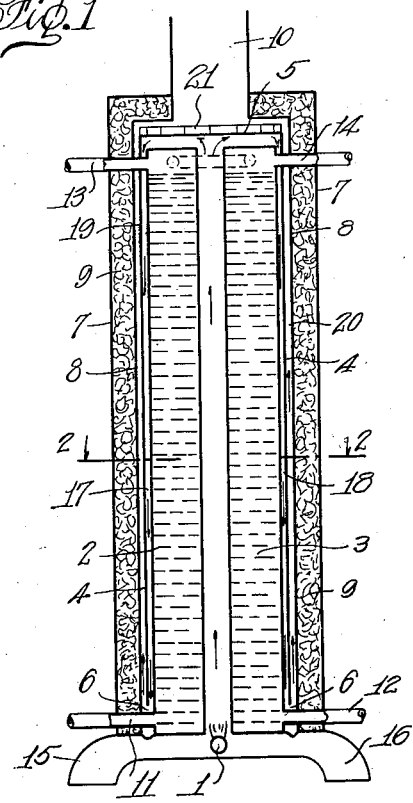
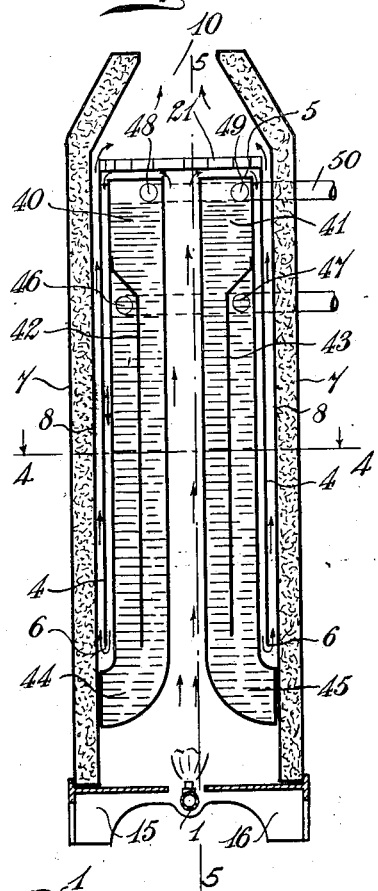
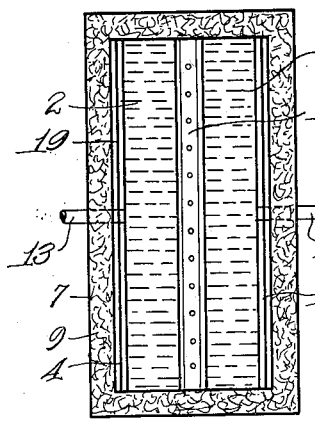
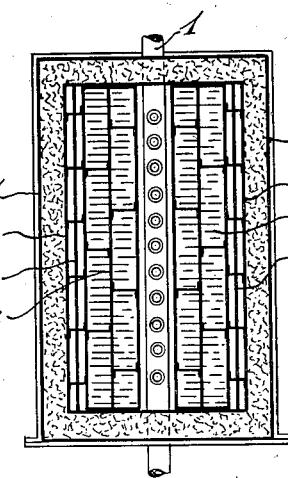
INVENTORS
J. G. Clark
C. A. Masterman
BY T. G. Noble
ATTORNEY July 3, 1934.　　J. G. CLARK ET AL　　1,965,278
GAS, AIR, OR LIQUID HEATING APPARATUS
Filed July 29, 1931　　3 Sheets-Sheet 2
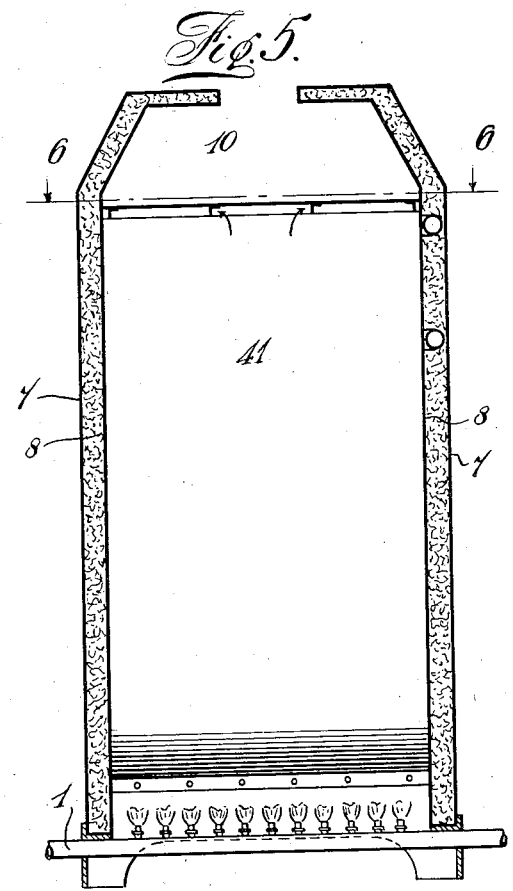
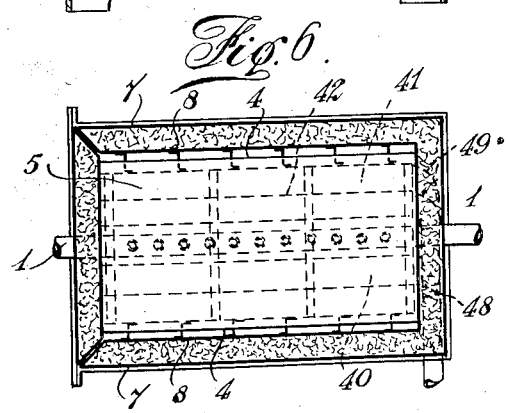
INVENTORS
J. G. Clark
C. A. Masterman
BY T. G. Noble
ATTORNEY July 3, 1934.  J. G. CLARK ET AL  1,965,278
GAS, AIR, OR LIQUID HEATING APPARATUS
Filed July 29, 1931  3 Sheets-Sheet 3
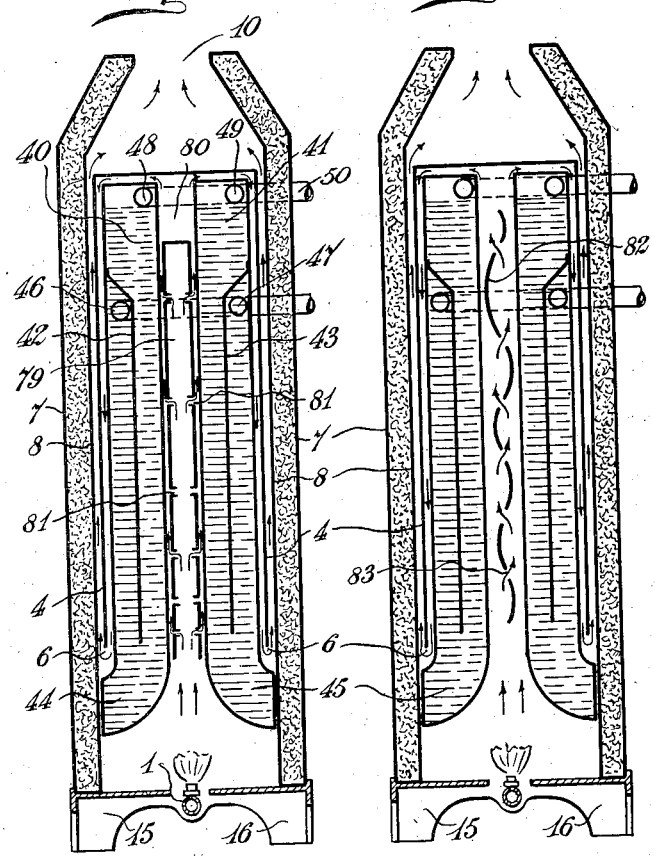
INVENTORS
J.G.Clark
C.A.Masterman
BY T.G.Noble
ATTORNEY Patented July 3, 1934

1,965,278

UNITED STATES PATENT OFFICE 1,965,278

GAS, AIR, OR LIQUID HEATING APPARATUS

Joseph George Clark, Cyril Aubyn Masterman, and Thomas George Noble, Westminster, England, assignors to The Gas Light and Coke Company, Westminster, England, a British Company Application July 29, 1931, Serial No. 553,900
In Great Britain August 6, 1930

6 Claims. (Cl. 257—232)

This invention relates to apparatus for heating gas, air or liquid and is more especially intended for use in heating water.

When fuel is consumed in an appliance a certain amount of sensible heat is available but in most cases there is a further amount of heat above the amount of available sensible heat that is only available if the flue products be cooled down below a certain temperature. This further heat is then obtained from the latent heat of the water which then condenses. The ratio of this latent heat to the sensible heat varies with different fuels.

In order to obtain higher efficiency the maximum amount of heat is taken from the hot products of combustion but it is usually essential to leave a certain proportion of heat in order to maintain the waste products at a sufficiently high temperature to provide adequate natural draught up the flue. Where this flue is long or exposed, it sometimes happens that the products are cooled below the critical condensation temperature so that water forms in the flue and this leads to trouble from corrosion or other causes.

The efficiency of the apparatus in terms of the gross calorific value of the fuel is therefore limited by the amount of latent heat the advantage of which is unutilized and, also, by the necessity of providing a certain balance of heat for flue pull.

In the present invention the hot products of combustion are cooled down in the apparatus to a maximum possible extent so that condensation of the water vapour therein occurs. Some portion of the sensible heat is taken from the hot gases and is returned into the cooled gases subsequently to this condensation. Consequently the flue gases leaving the apparatus may be at the same temperature as normal but as a considerable amount of condensation may have taken place a higher efficiency will be obtained, and also, there is less likelihood of condensation taking place in the flue.

The present invention is more particularly applicable to heating apparatus in which the heating medium employed may be gas or oil and is hereinafter described however in its application to gas heated water heating apparatus.

According to the present invention heating medium is constrained to flow in a path formed by the relative arrangement of a receptacle containing gas, air or liquid to be heated and a solid or hollow baffle so as to effect condensation of the water vapour and subsequent reheating of the residual gas as it flows to an outlet flue. In one form of the apparatus a receptacle containing gas, air or liquid to be heated is associated with a baffle which may be a solid or hollow casing or plate or it may be a flue so that the heating medium is constrained to flow initially upwardly in contact with one side of the said receptacle then downwardly between the baffle and the opposite side of the said receptacle then upwardly on the other side of the baffle to a flue or upwardly through the flue itself. The heating medium in a preferred form of the apparatus ascends between two members both of which contain liquid such as water the said heating medium thereafter flowing downwardly between a baffle and the outside of the liquid containing members and in contact with the outer or inner surfaces thereof to a point at or above or slightly below the level of the heating medium issuing from a suitable burner or burners and from thence upwardly through a flue or over the surface of an enclosing casing to the said flue. The latter may be disposed above or between the liquid containing members. Where the flue is disposed above the liquid containing members the enclosing casing is blocked from direct communication with the flue by a coverplate forming the top of the enclosing casing which is open at its lower end. The baffle casing may be a solid or hollow plate or a liquid container or a flue pipe.

In order that the invention may be clearly understood and readily carried into effect reference is made to the accompanying drawings which show diagrammatically and by way of example constructions of heating apparatus in accordance with the present invention.

Figure 1 is a sectional elevation of a rectangular type of heating apparatus in accordance with the present invention.

Figure 2 is a sectional plan on the line 2—2 Figure 1.

Figure 3 is a sectional elevation of a modified form of rectangular heating apparatus also in accordance with the present invention.

Figure 4 is a sectional plan on the line 4—4 Figure 3.

Figure 5 is a longitudinal section of the apparatus on the line 5—5 of Figure 3.

Figure 6 is a sectional plan on the line 6—6 Figure 5.

Figures 7 and 8 are sectional elevations of modified forms of the rectangular heating apparatus shown in Figure 3.

Referring to Figure 1 of the drawings 1 is a burner tube having a plurality of burners which may be of the Bunsen type or of the luminous flame type from which heating medium ascends between two hollow members 2, 3 one at least of which say the member 2 contains liquid such as water or other desired liquid which is to be heated. Both members 2 and 3 may however contain liquid to be heated as indicated. Either member of the hollow members 2, 3 may however contain gas or air to be heated by the heating medium from the burners in the burner tube 1. For convenience it will be assumed that the two hollow members 2 and 3 contain water which is to be heated. The heating medium arising from the burners ascends between the liquid containers 2, 3. Surrounding the liquid containers 2 and 3 is an inverted U shaped baffle casing 4 closed at the upper end as at 5 the lower end terminating at the rim 6 at or about the level of the burners in the burner tube 1. The baffle casing 4 is surrounded by two casings 7 and 8 between which heat insulating material 9 is disposed. The casing 8 is provided with an upwardly extending flue 10. 11 and 12 are water inlets to the water containers 2 and 3 respectively. The outlets 13, 14 may be connected to a pipe common to both outlets exteriorly of the apparatus. The apparatus may be supported on suitable legs 15, 16 or on a suitable stand as shown in Figures 5, 7 and 8. The casing 8 is spaced apart from the U shaped baffle casing 4 which is likewise spaced apart from the water containers so as to leave spaces for the flow of the products of combustion. The paths of the products of combustion are indicated by arrows. The condensate may be removed by a suitable trough. Although the apparatus is shown in Figures 1 and 2 of rectangular form it may be of circular form.

In the construction shown in Figures 3, 4, 5 and 6 the same principle as that described in connection with Figures 1 and 2 is utilized. In these figures however there are as before two water chambers 40 and 41, but each of these chambers is divided into two parts by a partition 42 and a partition 43 forming an inner chamber and an outer chamber in each water chamber these two latter being united at their lower ends as at 44, 45. The inlet for gas air or liquid in each outer chamber is shown at 46 and 47 respectively two outlets 48 and 49 from the water chambers 40 and 41 being preferably connected to a pipe 50 common to both outlets. As in the preceding figures, 4 is the inverted U shaped baffle casing, 5 the top thereof, preferably having ribs 21.

The apparatus hereinbefore described relies for its efficient operation on the principle of condensing the products of combustion and subsequent reheating of the said products of combustion. This is effected by the long path of travel which is provided for the products of combustion. Such efficiency however can be increased by the use of suitable perforated baffles which may be disposed in the space or spaces directly above a burner or burners. The products of combustion in ascending in the aforesaid space or spaces flow through holes or slots in the baffles to the space between the baffle or baffles and the adjacent face or faces of the water chamber or chambers. At each succeeding hole an increment of fresh products of combustion is added to the products of combustion in the spaces between the water chamber or chambers and the baffle and the velocity of the upwardly flowing products of combustion and the turbulence caused by the products of combustion issuing through the holes or slots removes or tends to remove any insulating flue gas film or films which may exist on the face of the water chamber or on adjacent faces of the water chambers and the layer of products of combustion flowing upwardly in the said spaces. Two such arrangements are shown in Figures 7 and 8. In Figure 7 which shows in sectional elevation a modified constructional form of the heating apparatus shown in Figure 3 a baffle member 79 is provided in the space 80 between the water chambers 40 and 41 and above the burner 1. The aforesaid baffle may be of hollow rectangular inverted U shaped form or it may be of circular tubular form. The walls of the baffle are provided with holes or slots 81 which may be formed as inwardly flanged slots or as outwardly flanged slots or some slots may be inwardly flanged and others outwardly flanged. In such an arrangement the products of combustion flow up the interior of the baffle member 79 as well as between the walls thereof and the adjacent faces of the water chambers 40 and 41. In flowing up the interior of the baffle the products of combustion escape through the holes or slots 81 into the spaces between the walls of the baffle and the adjacent faces of the water chambers and create a turbulent action which removes or tends to remove any insulating film existing on the said walls. A fresh increment of products of combustion escapes through the holes as the products of combustion ascend the interior of the baffle 79 thus adding further heat to the products of combustion arising in the spaces between the baffle and the adjacent walls of the water chambers.

In Figure 8 a further modified form is shown in which two water chambers 40, 41 are used as before and between these two water chambers is disposed a baffle plate 82 of a sinuous or corrugated form. The baffle plate 82 is provided with holes 83 the said holes being disposed beyond the humps or crests of the corrugations the pitch of which may remain constant throughout the length of the baffle plate. The amplitude of the corrugations decreases downwardly towards the burner tube 1. The pitch and amplitude may vary independently. Obviously either baffle of the baffles 79, 82 may be employed with all the apparatus shown in the figures of the drawings. The baffle 4 may be wholly or in part solid or hollow.

What we claim is:—

1. Apparatus for use in heating gas, air or liquid including a fluid-containing receptacle, a hollow baffle enclosing the same, the baffle being open at its lower end and closed at its upper end, a casing arranged beyond and spaced from the baffle, with the casing opening to a flue, and a perforated sinuous baffle plate arranged in the path of the products of combustion to create a turbulent action of the heating medium during the initial ascent of said medium.

2. A construction as described in claim 1, wherein the amplitude of the corrugations of the sinuous baffle decrease downwardly toward the burner.

3. An apparatus for use in heating gas, air or liquid comprising receptacles for the air, gas or liquid, a source of heat, a baffle plate overlying the receptacles and extending downwardly in spaced relation thereto, the lower end of the baffle plate being open, the closed end of the baffle plate being exposed to the more or less direct action of the heating source, and a member located beyond and spaced from the downwardly extending portion of the baffle plate and defining a passage open to a flue, with such passage leading across the upper end of the baffle plate, the heated products of combustion being directed longitudinally in direct contact with the receptacles and downwardly between the baffle and receptacles and then upwardly beyond the baffle to the flue, the downward flow of the products of combustion between the receptacles and baffle effecting condensation of the water vapor of such products and the upward flow of the products of combustion beyond the baffle and over the closed upper end thereof serving to reheat such products of combustion.

4. In a heating apparatus, receptacles having a passage therebetween closed against the receptacles, a baffle overlying and spaced from the outer surface of the receptacles, a flue closed at the upper end, with the closed end overlying the passage between the receptacles, a casing surrounding and spaced from the baffle and defining a passage leading across the closed end of the baffle and open to said flue, and a source of heat in line with the passage between the receptacles, the maximum heat of the products of combustion of the source of heat being directed through said passage and against the closed end of the baffle, the products of combustion passing downwardly between the baffle and receptacles and upwardly between the baffle and casing.

5. In a heating apparatus, receptacles having a passage therebetween closed against the receptacles, a baffle overlying and spaced from the outer surface of the receptacle, a flue closed at the upper end, with the closed end overlying the passage, a casing surrounding and spaced from the baffle and defining a passage opening to said flue, and a source of heat in line with the passage between the receptacles, the maximum heat of the products of combustion of the source of heat being directed through said passage and against the closed end of the baffle, the products of combustion passing downwardly between the baffle and receptacles and upwardly between the baffle and casing, the lower end of the baffle being open for the discharge of the water of condensation from the products of combustion.

6. An apparatus for use in heating gas, air or liquid comprising receptacles for the air, gas or liquid, a source of heat, a baffle plate overlying the receptacles and extending downwardly in spaced relation thereto, the lower end of the baffle plate being open, the closed end of the baffle plate being provided with ribs and being exposed to the more or less direct action of the heating source, and a member located beyond and spaced from the downwardly extending portion of the baffle plate and defining a passage open to a flue, with such passage leading across the ribs of the upper end of the baffle plate.

JOSEPH GEORGE CLARK.
CYRIL AUBYN MASTERMAN.
THOMAS GEORGE NOBLE.